Aug. 27, 1957    J. B. WHEATLEY    2,804,280
TURBINE BEARING LUBRICATION SYSTEM
Filed March 20, 1951    2 Sheets-Sheet 1
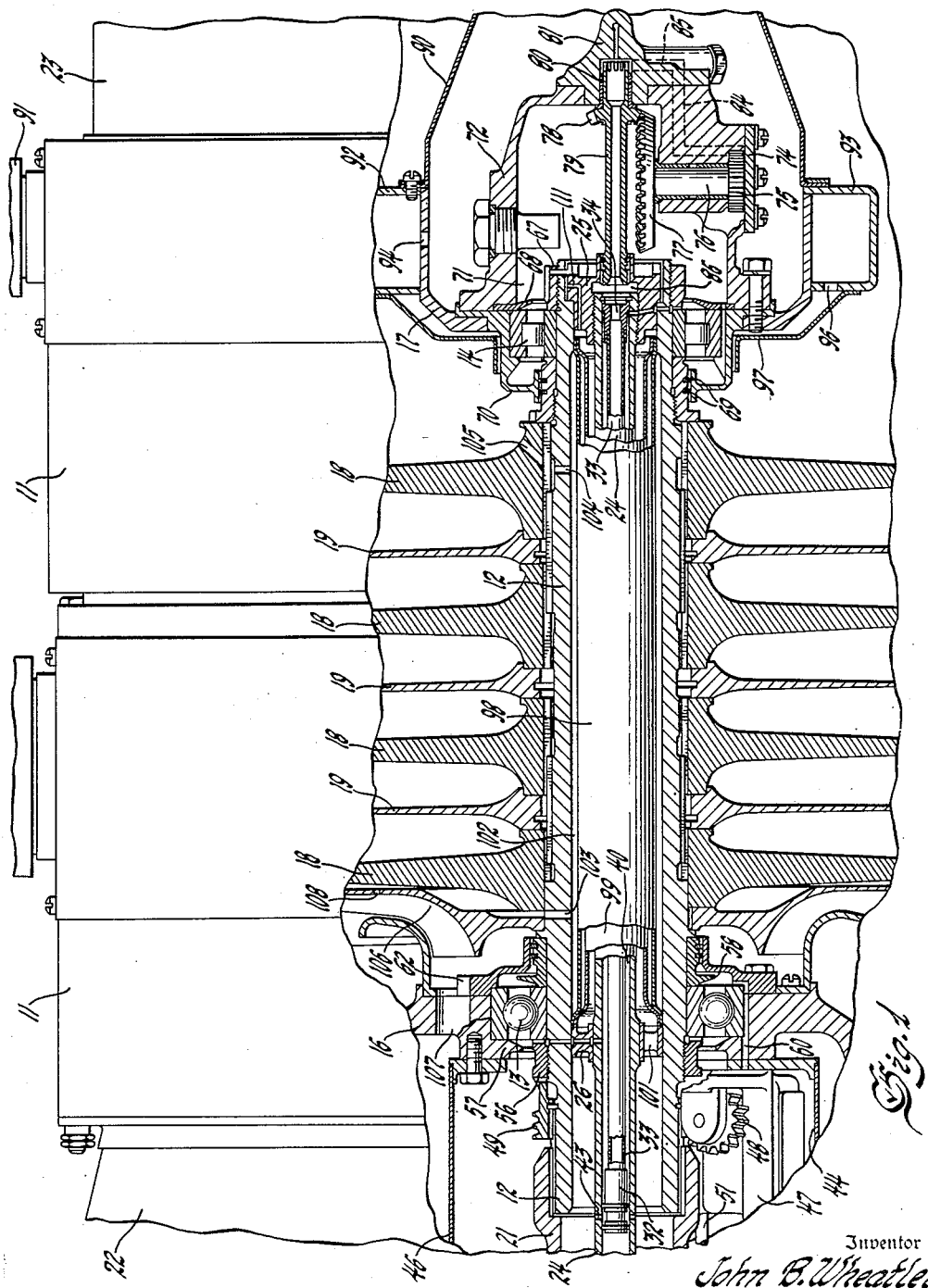
Inventor
John B. Wheatley
By Willits, Helwig & Caillio
Attorneys Aug. 27, 1957  J. B. WHEATLEY  2,804,280
TURBINE BEARING LUBRICATION SYSTEM
Filed March 20, 1951  2 Sheets-Sheet 2
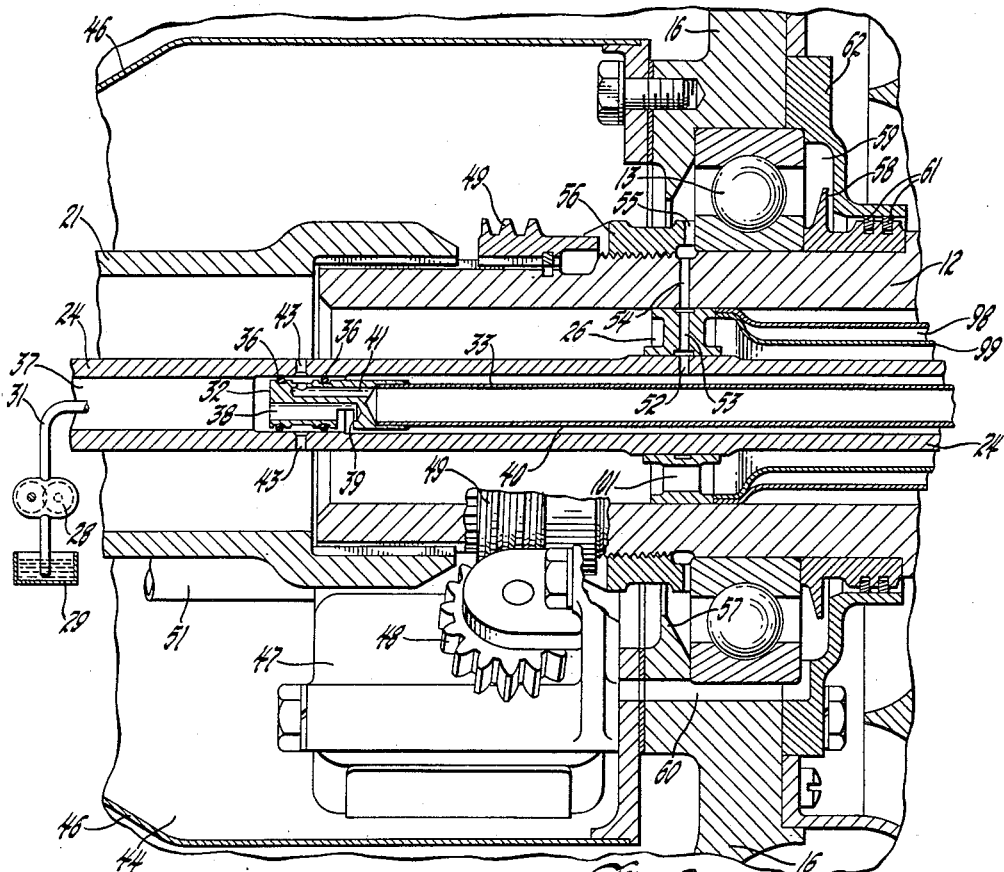
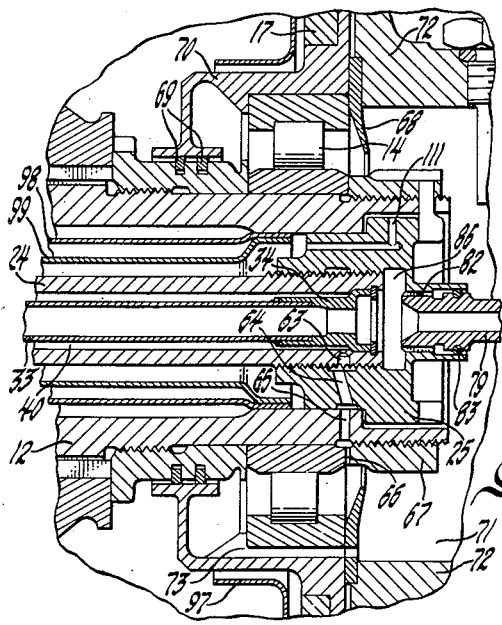
Inventor
John B. Wheatley
By Willits, Helmig & Caillio
Attorneys United States Patent Office 2,804,280
Patented Aug. 27, 1957

2,804,280

TURBINE BEARING LUBRICATION SYSTEM

John B. Wheatley, Indianapolis, Ind., assignor to General Motors Corporation, Detroit, Mich., a corporation of Delaware Application March 20, 1951, Serial No. 216,555

10 Claims. (Cl. 253—39.15)

This invention relates to the lubrication of rotating machinery, and is particularly directed to improved lubrication of shaft bearings of gas turbines.

Gas turbine engines present a difficult problem in regard to lubrication, for various reasons. Perhaps the most serious is the very high temperature encountered in such engines. Another important factor is the high shaft speed which, in aircraft engines, is ordinarily from 8000 to 15000 R. P. M. The considerable thrust loads and the high radial loads on the bearings resulting from maneuvers of an aircraft are additional factors. The difficulties are increased by the very compact design of such engines and the necessity for conserving space and weight.

The turbine bearings ordinarily lie within an annular or nearly annular passage or duct carrying extremely hot combustion gases, this passage being defined by the combustion apparatus of the engine, the turbine casing and rotor, and the turbine exhaust duct. Arrangements for supplying oil radially inward to the bearings from outside the engine require that the oil flowing to and from the bearings be conducted through this annular hot gas duct, which leads to an unsatisfactory installation. In such an arrangement, the oil lines must be protected from the heat with the result that a very considerable obstruction must be placed in the combustion gas passage.

It has, therefore, been proposed to circulate oil to the turbine bearings through the turbine shaft. An arrangement of this sort is described and claimed in U. S. Patent 2,693,248 of Wheatley and Gaubatz. In the system disclosed in that patent the oil is supplied from a pressure pump to the front end of a hollow tie bolt which extends through the coaxial turbine and compressor shafts of the engine. The oil is fed through the tie bolt to the turbine bearings and the scavenge oil from the rear turbine bearing is returned through the annular passage between the tie bolt and the hollow turbine shaft.

This invention is directed to an improvement of the lubrication system disclosed in the Wheatley and Gaubatz patent to reduce the heating of the oil and thus improve the characteristics of the lubrication system.

The principal objects of the invention are to improve the lubrication of rotating machines, particularly gas turbines, and to provide a lubrication system for a turbine bearing providing the maximum practicable insulation of the oil from the heat of the engine. A further object is to accomplish the above-mentioned objects without additional space requirements and with a minimum of modification of the engine.

The preferred manner in which these objects are accomplished and the advantages of the invention will be apparent to those skilled in the art from the succeeding detailed description of the preferred embodiment of the invention.

Referring to the drawings: Figure 1 is an elevation view of the turbine of a gas turbine engine, parts being shown in section along the axis of the engine; Figure 2 is an enlarged section on the axis of the engine of the forward turbine bearing and adjacent structure; Figure 3 is a similar view of the rear turbine bearing and adjacent structure; and Figure 4 is a still further enlarged section on the axis of the engine of the oil transfer fitting.

The turbine portion only of an aircraft gas turbine engine is shown and described herein in the interest of clarity of the drawings and conciseness of the specification, since the general arrangement of such engines is well understood by those skilled in the art to which this invention relates. The general structure of such an engine is more fully shown in the aforementioned application of Wheatley and Gaubatz.

Referring to Figure 1, the engine comprises a turbine, the casing or stator of which is indicated generally at 11. The structure of the turbine stator is immaterial to the invention. The turbine comprises a shaft 12 supported in a ball thrust bearing 13 at the forward or inlet end of the turbine and a roller bearing 14 at the rear or exhaust end. The bearings are mounted in frame structures 16 and 17 respectively fixed to the stator 11. Four turbine wheels 18 and three disks 19 which cooperate with the sealing structure on the stationary vanes of the turbine (not shown) are fixed on the turbine shaft in any appropriate manner.

The forward end of the turbine shaft is splined for cooperation with a splined coupling shaft 21 by which the power generated by the turbine is transmitted to the compressor and to a driven device. The turbine is supplied with motive fluid from a combustion apparatus indicated generally at 22 and exhausts through a duct 23.

A hollow member 24 which functions as a tie bolt extends through the turbine shaft, the coupling shaft 21, and the shaft of the compressor (not shown) which is coaxial with the turbine shaft. The rear end of the tie bolt is secured by a nut 25 and the tie bolt is held concentric with the turbine shaft by a collar 26 adjacent the bearing 13.

Lubricating oil under pressure is supplied to the forward part of the tie bolt (not shown) in any suitable manner, as for example, by the means shown in the abovementioned Wheatley and Gaubatz patent. In Figure 2, the oil supply means is indicated schematically by a pump 28 drawing oil from a reservoir 29 and delivering it through a conduit 31 to the tie bolt 24. The tie bolt constitutes a tube or conduit for delivering the oil to the turbine bearings.

At the forward end of the turbine shaft 12 a transfer plug or fitting 32 is mounted in the internal bore of the tubular tie bolt. This fitting is bored at its rear end to form a seat for a scavenge oil return tube or conduit 33 disposed concentrically within the tie bolt 24 and extending substantially the length of the turbine shaft to a sleeve 34 seated in the rear end of the tie bolt and held in place by a snap ring. The tube 33 is brazed or otherwise fixed in the fittings 32 and 34 and, as shown more clearly in Figure 4, the fitting 32 is slidably mounted in the tie bolt by means of O-ring seals 36 mounted in circumferential grooves in the fitting. Oil for lubrication of the turbine bearings 13 and 14 is supplied through the passage 37 in the tie bolt and through a longitudinal passage 38 (Fig. 4) and a lateral opening 39 in the fitting 32 to a passage 40 between the inner wall of the tie bolt and the outer wall of tube 33.

The manner in which this oil is distributed to the bearings will be explained presently, as well as the manner in which the scavenge oil from the rear turbine bearing is delivered to the rear end of tube 33. This scavenge oil flows forwardly through tube 33 and a passage 41 in the fitting 32 into the space 42 between the O-rings 36 and outward through radial outlet passages 43 in the wall of the tie bolt to the interior of the coupling shaft 21 adjacent the front end of the turbine shaft. The scavenge oil is held against the surface of the coupling shaft 21 by centrifugal force and escapes between the splines by which this shaft is coupled to the turbine shaft 12 and thus into a sump 44 defined by a housing 46 surrounding the coupling shaft 21. The oil is returned from the sump 44 to the reservoir by a scavenge pump 47 driven by a worm gear 48 which is driven by a worm 49 mounted on the turbine shaft. The structure of the pump 47 is immaterial to the invention. The oil may be conducted from this pump through a tube 51 to the forward end of the engine.

The forward turbine bearing 13 is lubricated from the passage 40 through radial passages 52, 53, 54, and 55 formed in the tie bolt, the colar 26, the turbine shaft 12, and a retainer 56 for the turbine bearing, respectively. The oil is directed into the bearing by a deflector 57 on the frame member 16. Oil may escape from the bearing through the opening in the deflector 57 directly into the sump 44. Oil leaving the rear face of the bearing is thrown by slinger 58 on the turbine shaft into a pocket 59 from which it drains through a passage 60 into the sump 44. Seals 61 engaging a fixed ring 62 prevent flow of the oil into the turbine.

Lubricating oil for the rear turbine bearing 14 proceeds through the passage 40, which is closed at its rear end by the sleeve 34 (Fig. 3), flows radially outward through passages 63, 64, 65, and 66 in the tie bolt 24, the nut 25, the turbine shaft 12, and the rear bearing retainer 67, respectively. The arrangement at the rear bearing is similar to that at the forward bearing, with a deflector 68 and with seals 69 engaging a cylindrical surface in the bearing retaining ring 70. The oil from the bearing either falls directly into a sump 71 (Figs. 1 and 3) formed in a rear scavenge pump housing 72 or flows through a groove 73 in the bearing retainer ring to the sump. The scavenge pump housing 72 is bolted to the rear bearing support 17. It provides a casing for a gear pump 75, the gears of which are enclosed by cover plate 74. The shaft 76 of the scavenge pump is rotated by a gear 77 meshing with a gear 78 integral with a hollow shaft 79 (Fig. 1). Shaft 79 is rotatable in a bushing 80 in a rear cover plate 81 of the pump housing and the forward end of the shaft is splined at 82 (Fig. 3) to the tie bolt nut 25 for rotation by the turbine shaft. An O-ring seal 83 is fitted between the shaft 79 and the nut 25. The pump 75 discharges through passages 84 and 85 in the housing 72 and end cover 81 into the rear end of the hollow shaft 79, through which the scavenge oil passes into the cavity 86 in the nut 25 and forwardly through the tube 33, from which it is discharged as previously described.

The pump housing 72 is enclosed by a sheet metal casing 90 which serves as a heat shield through which cooling air is circulated. A cooling air line from any suitable source is connected at 91 so the air flows inwardly through one or more of the hollow struts 92 which support the bearing support 17. The struts 92 discharge the cooling air into a ring 93 surrounding the bearing support, from which it is discharged through ports 94 into the enclosure around the pump housing and discharges through the rear portion of the shield 90. Additional cooling air flows through ports 96 in the forward face of the annulus 93 and between the bearing support ring 70 and a sheet metal plate or shield 97, the shield 97 and the cooling air flowing under the shield protecting the bearing 14 against heat radiated from the turbine wheels. Additional cooling is obtained by the flow of lubricating oil, which carries away substantial quantities of heat.

It is important that the lubricating oil be kept as cool as practicable to improve its lubricating and cooling qualities. The turbine shaft 12 is unavoidably hot because of conduction from the turbine wheels. In order to keep the oil as cool as possible, heat shields are provided between the turbine shaft and the tie bolt and air is circulated through the turbine shaft for cooling. The heat shields comprise two tubes 98 and 99 of bright metal, such as stainless steel, which are expanded at the ends so as to fit together and fit within the turbine shaft. These sleeves are located axially by the collar 26 and the tie bolt nut 25. By virtue of these sleeves, three concentric air spaces are formed between the tie bolt and the turbine shaft. The inner two of these are dead air spaces which may vent through an opening 101 in the collar 26 to provide for expansion of the air. Air under pressure from the compressor or other source is circulated through the air space 102 between the shield 98 and the turbine shaft. This air enters ahead of the first turbine wheel 18 through a radial passage or passages 103 in the turbine shaft 12 and exhausts through similar passages 104 in the turbine shaft and radial passages 105 in the hub of the rear turbine wheel, from which the air passes to the exhaust of the turbine. The cooling air may be supplied in any suitable manner. As illustrated, air is supplied to a centrifugal fan 106 mounted ahead of the first turbine wheel through an opening 107 in the frame 16 from the compressor or other suitable source. Some of this air is bled off through openings 108 in the disk of the fan wheel 106 and flows between the fan wheel and the adjacent turbine wheel 18 to the passages 103 leading into the interior of the turbine shaft. The space between the turbine shaft and the tie bolt is also vented through a passage 111 in the tie bolt nut 25.

It is believed that the operation of the system will be clear to those skilled in the art from the foregoing. The pump 28 may be driven by the engine or in any other way to force oil into the tie bolt 24 for lubrication and cooling of bearings 13 and 14. Scavenge oil from the bearing 14 is returned by the pump 75 through the tubes 79 and 33 and discharged through the openings 43 in the tie bolt into the shaft 21 from which it is forced by centrifugal force through the splines between this shaft and the turbine shaft, lubricating the splines.

By circulating the oil through the tie bolt and protecting the tie bolt from the heat of the turbine shaft, relatively cool oil is delivered to the rear turbine bearing, which requires considerable cooling for successful operation. The installation is sufficiently compact that it may be easily incorporated without enlarging the turbine shaft or tie bolt beyond the dimensions required for adequate strength and rigidity. The apparatus is easily assembled and disassembled, and the manner in which the transfer fitting 32 is mounted provides for relative expansion of the tie bolt and the tube 33.

It will be understood that the specific embodiment described is merely illustrative of the principles of the invention, which may be embodied in various structures coming within the scope of the invention.

I claim:

1. A rotary machine comprising, in combination, a hollow rotary shaft, a bearing on the shaft, and means for lubricating the bearing through the shaft comprising first and second tubes mounted on the shaft extending through the shaft to the region of the bearing, one of the tubes being mounted within and spaced from the other, the tubes thus defining two oil passages, the passages communicating with the bearing, means connected to one passage for supplying oil under pressure to the one passage for transmission to the said bearing, means connected to the other passage for returning scavenge oil from the bearing through the other passage, and means connected to the said other passage providing an outlet passage for the scavenge oil to the outside of the shaft at a point remote from the said bearing.

2. A turbine comprising, in combination, a hollow turbine shaft including a wheel-bearing portion, turbine wheels on the wheel-bearing portion of the shaft, a bearing on the shaft, and means for lubricating the bearing through the wheel-bearing portion of the shaft comprising first and second tubes mounted on the shaft extending through the wheel-bearing portion of the shaft to the region of the bearing, one of the tubes being mounted within and spaced from the other, the tubes thus defining two oil passages, the passages communicating with the bearing, means connected to one passage for supplying oil under pressure to the one passage for transmission to the said bearing, means connected to the other passage for returning scavenge oil from the bearing through the other passage, and means connected to the said other passage providing an outlet passage for the scavenge oil to the outside of the turbine shaft at the end of the turbine opposite from the said bearing.

3. A turbine as recited in claim 2 in which the said other tube is spaced radially from the wheel-bearing portion of the shaft and including means between the said other tube and the wheel-bearing portion of the shaft to reduce heat transmission from the shaft to the said other tube.

4. A turbine comprising, in combination, a hollow turbine shaft including a wheel-bearing portion, turbine wheels on the wheel-bearing portion of the shaft, a bearing on the shaft, and means for lubricating the bearing through the wheel-bearing portion of the shaft comprising first and second tubes mounted on the shaft extending through the wheel-bearing portion of the shaft to the region of the bearing, one of the tubes being mounted within and spaced from the other, the tubes thus defining inner and outer oil passages, the passages communicating with the bearing, means connected to the outer passage for supplying oil under pressure to the outer passage for transmission to the said bearing, means connected to the inner pasage for returning scavenge oil from the bearing through the inner passage, and means connected to the inner passage providing an outlet for the scavenge oil to the outside of the turbine shaft at the end of the turbine opposite from the said bearing.

5. A rotary machine comprising, in combination, a hollow shaft having ends, a bearing on the shaft at one end of the shaft, and means for lubricating the bearing from the other end of the shaft comprising a hollow member mounted in the shaft and extending through the shaft to the bearing, means communicating with the member and the bearing for conducting oil from the member to the bearing, a tube mounted in the member extending the length of the shaft, means anchoring the tube in the member against movement axially of the member, the last-mentioned means being located near the said bearing, means connected to the tube for returning scavenge oil from the bearing to the tube, means for conducting the scavenge oil to the exterior of the member comprising a fitting on the tube adjacent the end of the turbine shaft remote from the said bearing, the said fitting defining a passage connecting the interior of the tube with the wall of the member and being axially movable relative to the member, and an outlet opening in the wall of the member communicating with the tube through the said fitting passage.

6. A turbine comprising, in combination, a hollow turbine shaft having ends, turbine wheels on the shaft between the ends thereof, a bearing on the shaft at one end of the shaft, a power output shaft coupled to the other end of the turbine shaft, and means for lubricating the bearing from the other end of the power output shaft comprising a hollow member mounted in the shafts and extending through the shafts to the bearing, means communicating with the member and the bearing for conducting oil from the member to the bearing, a tube mounted in the member extending the length of the turbine shaft, means anchoring the tube in the member against movement axially of the member, the last-mentioned means being located near the said bearing, means connected to the tube for returning scavenge oil from the bearing to the tube, means for conducting the scavenge oil to the exterior of the member comprising a fitting on the tube adjacent the end of the turbine shaft remote from the said bearing, the said fitting defining a passage connecting the interior of the tube with the wall of the member and being axially movable relative to the member, and an outlet opening in the wall of the member communicating with the tube through the said fitting passage, the outlet opening being located interiorly of the power output shaft so as to discharge the scavenge oil into the power output shaft.

7. A turbine comprising, in combination, a hollow turbine shaft having ends, turbine wheels on the shaft between the ends thereof, a bearing on the shaft at one end of the shaft, and means for lubricating the bearing from the other end of the shaft comprising a hollow member mounted in the shaft and extending through the shaft to the bearing, means communicating with the member and the bearing for conducting oil from the member to the bearing, a tube mounted in the member extending the length of the turbine shaft, means anchoring the tube in the member against movement axially of the member, the last-mentioned means being located near the said bearing, means connected to the tube for returning scavenge oil from the bearing to the tube, means for conducting the scavenge oil to the exterior of the member comprising a fitting on the tube adjacent the end of the turbine shaft remote from the said bearing, the said fitting defining a passage connecting the interior of the tube with the wall of the member and being axially movable relative to the member, and an outlet opening in the wall of the member communicating with the tube through the said fitting passage, heat shields mounted between the turbine shaft and the member defining annular air spaces between the shaft and member, and means for circulating air for cooling through at least one of said spaces, the last-mentioned means being connected to said one of said spaces.

8. A machine comprising, in combination, a hollow shaft; two bearings on the shaft spaced axially of the shaft; means for supplying oil under pressure; inner and outer tubes extending through the shaft from one bearing to the other, the inner tube being spaced from the outer tube to define an oil supply passage therebetween and the inner tube defining a scavenge oil passage; the outer tube including a portion extending axially beyond the inner tube and communicating with the oil supplying means; a fitting mounted in the outer tube and connected to one end of the inner tube supporting the inner tube in the outer tube, the fitting defining a passage connecting the said portion of the outer tube to the said oil supply passage; means connecting with the oil supply passage defining passages communicating with the said bearings for supplying oil thereto; and means connected to the inner tube at the end thereof remote from the fitting for returning scavenge oil from one of the bearings to the inner tube; the fitting and the outer tube defining a scavenge oil outlet passage connecting the inner tube with the exterior of the outer tube.

9. A turbine comprising, in combination, a hollow shaft; two bearings on the shaft spaced axially of the shaft; turbine wheels on the shaft between the bearings; means for supplying oil under pressure; inner and outer tubes extending through the shaft from one bearing to the other, the inner tube being spaced from the outer tube to defined an oil supply passage therebetween and the inner tube defining a scavenge oil passage; the outer tube including a portion extending axially beyond the inner tube and communicating with the oil supplying means; a fitting mounted in the outer tube and connected to one end of the inner tube supporting the inner tube in the outer tube, the fitting defining a passage connecting the said portion of the outer tube to the said oil supply passage; means connecting with the oil supply passage defining passages communicating with the said bearings for supplying oil thereto; means connected to the inner tube at the end thereof remote from the fitting for returning scavenge oil from one of the bearings to the inner tube; the fitting and the outer tube defining a scavenge oil outlet passage connecting the inner tube with the exterior of the outer tube; the outer tube being spaced radially from the interior of the shaft to provide an annular air space between the shaft and the outer tube; and tubular heat shields mounted between the shaft and outer tube.

10. A turbine comprising, in combination, a hollow shaft; two bearings on the shaft spaced axially of the shaft; turbine wheels on the shaft between the bearings; means for supplying oil under pressure; inner and outer tubes extending through the shaft from one bearing to the other, the inner tube being spaced from the outer tube to define an oil supply passage therebetween and the inner tube defining a scavenge oil passage; the outer tube including a portion extending axially beyond the inner tube and communicating with the oil supplying means; a fitting mounted in the outer tube and connected to one end of the inner tube supporting the inner tube in the outer tube, the fitting defining a passage connecting the said portion of the outer tube to the said oil supply passage; means connecting with the oil supply passage defining passages communicating with the said bearings for supplying oil thereto; means connected to the inner tube at the end thereof remote from the fitting for returning scavenge oil from one of the bearings to the inner tube; the fitting and the outer tube defining a scavenge oil outlet passage connecting the inner tube with the exterior of the outer tube; the outer tube being spaced radially from the interior of the shaft to provide an annular air space between the shaft and the outer tube; and means communicating with said space for circulating cooling air through said space.

References Cited in the file of this patent

UNITED STATES PATENTS

| | | |
|---|---|---|
| 1,470,769 | Shaw | Oct. 16, 1923 |
| 2,190,254 | Caproni | Feb. 13, 1940 |
| 2,457,999 | Hulbert | Jan. 4, 1949 |
| 2,461,239 | Schuster | Feb. 8, 1949 |
| 2,479,046 | Ledwith | Aug. 16, 1949 |
| 2,479,056 | Bodger | Aug. 16, 1949 |
| 2,480,095 | Buchi | Aug. 23, 1949 |
| 2,606,501 | Dreibelbis | Aug. 12, 1952 |